United States Patent
Ledentsov et al.

(10) Patent No.: US 8,478,133 B2
(45) Date of Patent: Jul. 2, 2013

(54) METHOD FOR ENCODING AND DECODING OF OPTICAL SIGNALS

(75) Inventors: Nikolai Ledentsov, Berlin (DE); Vitaly Shchukin, Berlin (DE)

(73) Assignee: VI Systems GmbH, Berlin (DE)

( * ) Notice: Subject to any disclaimer, the term of this patent is extended or adjusted under 35 U.S.C. 154(b) by 79 days.

(21) Appl. No.: 12/923,465

(22) Filed: Sep. 23, 2010

(65) Prior Publication Data
US 2011/0076026 A1    Mar. 31, 2011

Related U.S. Application Data

(60) Provisional application No. 61/272,476, filed on Sep. 28, 2009.

(51) Int. Cl.
*H04B 10/04* (2006.01)
*H04B 10/12* (2006.01)

(52) U.S. Cl.
USPC ........... 398/189; 398/140; 398/182; 398/183; 398/191; 398/202

(58) Field of Classification Search
USPC ... 398/140, 182, 183, 189, 191, 202; 375/290
See application file for complete search history.

(56) References Cited

U.S. PATENT DOCUMENTS
2006/0140644 A1*  6/2006  Paolella ..................... 398/189

* cited by examiner

*Primary Examiner* — Kenneth N Vanderpuye
*Assistant Examiner* — Daniel Dobson (57) ABSTRACT

The present invention refers to a method for robust multi-level encoding of optical signals. The method uses a transmitter that transforms electric signals into optical signals and a receiver capable to transform optical signals into electric signals. The transmitter is capable to generate optical pulses having at least two different durations. The amplitudes of the pulses are preferably close to each other. The transmitter is fast, and the receiver is slow such that the response time of the receiver exceeds at least the shortest of the durations of the optical pulses. Then the receiver effectively integrates the optical signal and generates the electric signal having a larger amplitude when the optical signal has a larger duration. Thus, the method converts the modulation in pulse duration into the modulation in signal amplitude. In different embodiments of the present invention, the transmitter can be realized by a light-emitting diode, superluminescent light-emitting diode, or a diode laser. The receiver can be realized by a p-i-n diode, by a resonant cavity photodetector, or by an avalanche photodiode.

8 Claims, 6 Drawing Sheets

METHOD FOR ENCODING AND DECODING OF OPTICAL SIGNALS

REFERENCE TO RELATED APPLICATIONS

This application claims an invention which was disclosed in Provisional Application No. 61/272,476, filed Sep. 28, 2009, entitled "Method for Encoding of Optical Signals". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of encoding and decoding of optical signals and to the field of semiconductor optoelectronic devices.

2. Description of Related Art

Figure 1:
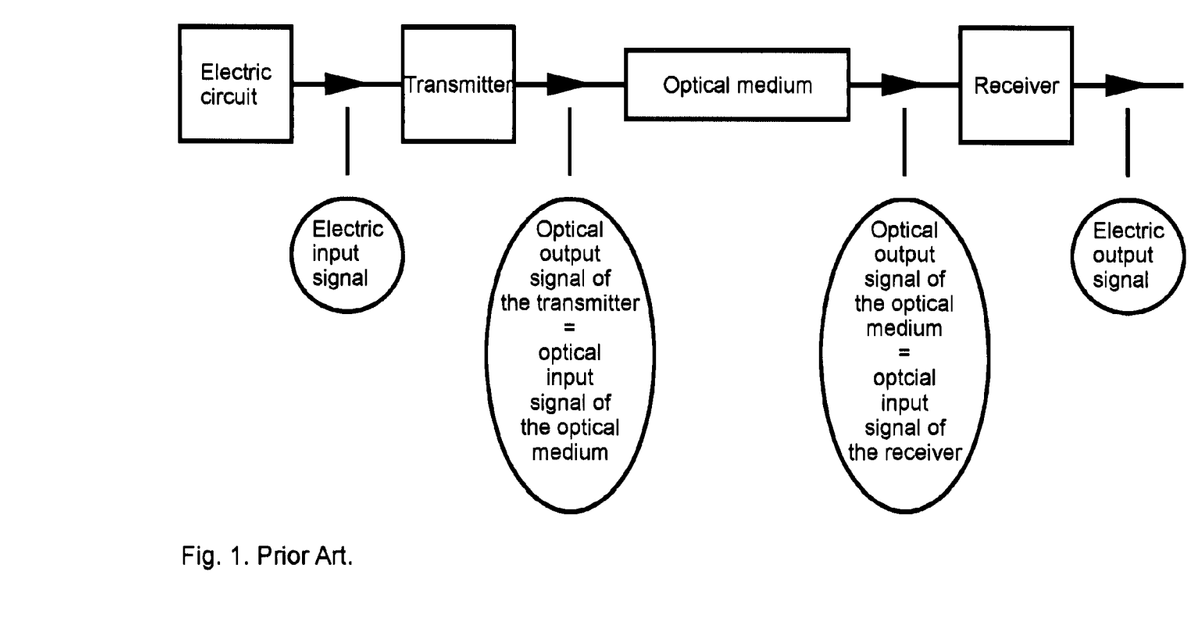
FIG. 1 shows schematically a scheme of signal transmission.

The rate of information transfer increases many-fold each decade. A permanent need in a speed increase and reducing power consumption leads to the fact that the application field of optoelectronic devices used in the information transfer is gradually expanding. FIG. 1 shows schematically a general scheme of the information transfer using optoelectronic components. An electric circuit generates an electric input signal which comes to a transmitter. The transmitter transforms an electric signal into an optical input signal. The optical input signal propagates through an optical medium and comes to a receiver in a form of an optical output signal. If the optical medium has no or a low dispersion, the optical output signal repeats the shape of the optical input signal. The receiver transforms an optical output signal into an electrical output signal.

Figure 2:
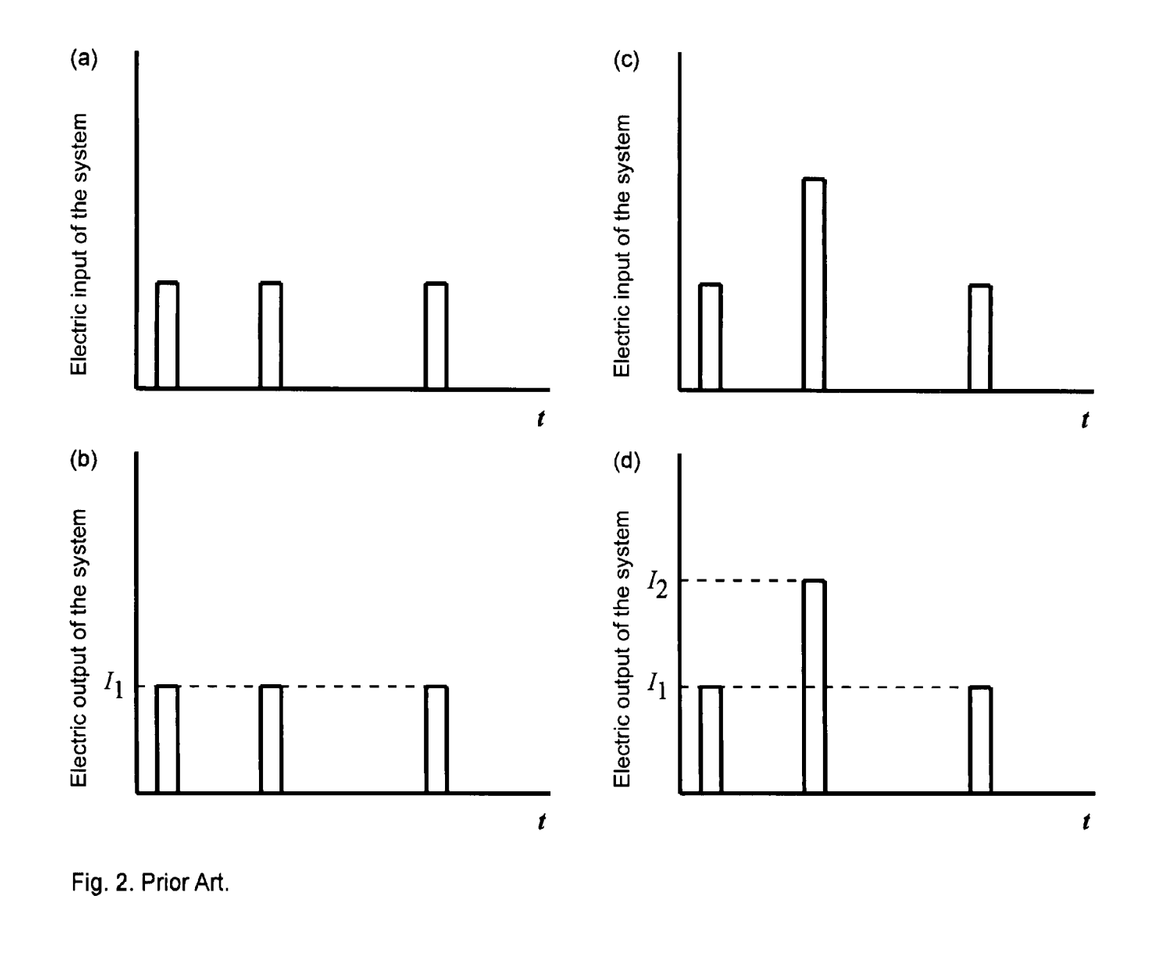
FIG. 2(a) shows a schematic diagram of a sequence of optical pulses transmitted by a transmitter, wherein a two-level encoding of pulses is used.
FIG. 2(b) shows a schematic diagram of an idealized sequence of electric pulses generated by a receiver after the transmitter has transmitted the sequence of FIG. 1(a) using the two-level encoding.
FIG. 2(c) shows a schematic diagram of an idealized sequence of optical pulses transmitted by a transmitter, wherein a three-level encoding of pulses is used.
FIG. 2(d) shows a schematic diagram of an idealized sequence of electric pulses generated by a receiver received after the transmitter has transmitted the sequence of FIG. 2(c) using the three-level encoding.

Typically, to ensure robust and error-free operation, a digital encoding of the signal is used. For example, a sequence of pulses using a two-level encoding is applied, i.e. the pulse amplitudes alternate between the level "zero" and the level "one". FIG. 2(a) shows schematically a sequence of input electric pulses applied using the two-level encoding systems. In an idealized case, the sequence of output electric pulses should be the same, as shown in FIG. 2(b).

The repetition rate of pulses is usually limited by the high frequency performance of the transmitter and receiver. To increase the information transfer rate keeping the same repetition rate of pulses, a multi-level encoding can be used. FIG. 2(c) shows schematically a sequence of input electric pulses in a scheme using three-level encoding. In an idealized case, the sequence of output electric pulses should be the same, as shown in FIG. 2(d).

Figure 3:
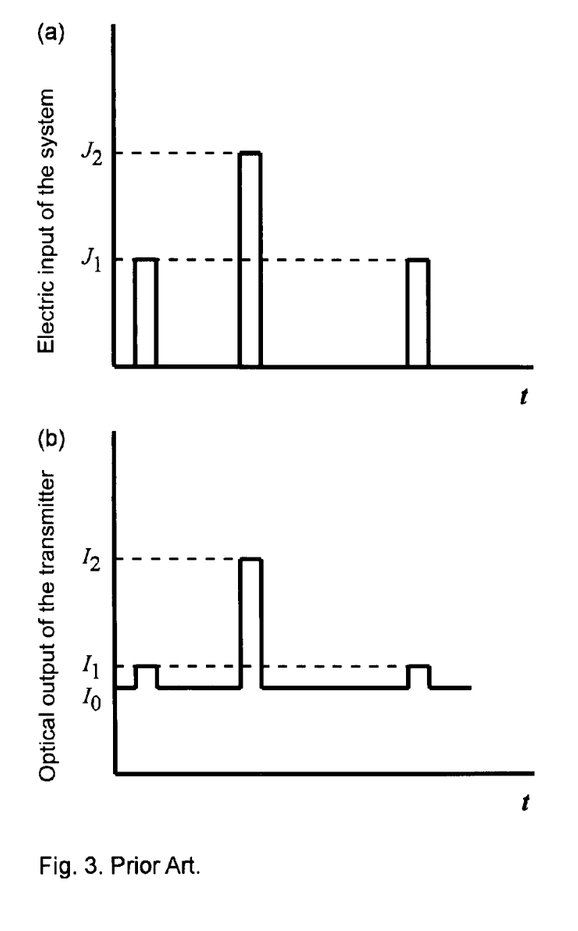
FIG. 3(a) shows a schematic diagram for an ideal sequence of optical pulses generated by a transmitter wherein three-level encoding is applied.
FIG. 3(b) shows schematically a possible obstacle by using a three-level encoding, wherein one signal level drifts close to another signal level such that they become hardly distinguishable.

However, multilevel encoding faces severe problems regarding generating multi-level optical pulses by a transmitter. Operation of an optoelectronic device is sensitive to temperature variations, and the level of an optical signal generated by the transmitter can deviate from the pre-set value. FIG. 3 illustrates such a deviation. FIG. 3(a) shows a sequence of pulses of the electric input signal, and FIG. 3(b) shows the optical signal generated by the transmitter. The "zero" level has shifted and is now at the level $I_0$. Since the levels of the optical signals $I_0$ and $I_1$ are now hardly distinguishable, this creates possible errors in the information transfer.

Thus, there is a need in the art to develop a robust method of the information transfer which is equivalent to a multi-level encoding, but at the same time robust against temperature variations and corresponding deviations of the characteristics of the optoelectronic devices.

SUMMARY OF THE INVENTION

The present invention refers to a method for robust multi-level encoding of optical signals. The method uses a transmitter that transforms electric signals into optical signals and a receiver capable to transform optical signals into electric signals. The transmitter is capable to generate optical pulses having at least two different durations. The amplitudes of the pulses are preferably close to each other. The transmitter is fast, and the receiver is slow such that the response time of the receiver exceeds at least the shortest of the durations of the optical pulses. Then the receiver effectively integrates the optical signal and generates the electric signal having a larger amplitude when the optical signal has a larger duration. Thus, the method converts the modulation in pulse duration into the modulation in signal amplitude. In different embodiments of the present invention, the transmitter can be realized by a light-emitting diode, superluminescent light-emitting diode, or a diode laser. The receiver can be realized by a p-i-n diode, by a resonant cavity photodetector, or by an avalanche photodiode.

BRIEF DESCRIPTION OF THE DRAWINGS

FIGS. 4(a) through 4(d) illustrate schematically a scheme of encoding and decoding using a fast transmitter and a slow receiver according to an embodiment of the present invention.

FIGS. 6(a) through 6(f) refer to a particular realization of input pulses of different duration wherein the input optical signal coming to a receiver is phase-modulated.

DETAILED DESCRIPTION OF THE INVENTION

The present invention teaches using a fast transmitter and a slow receiver. Encoding in the fast transmitter results in generating optical pulses having preferably the same amplitude but different duration. These are "optical output signals of the transmitter", according to FIG. 1. The same is valid for "optical input signals of the receiver" coming to the receiver. The slow receiver has the characteristic response time preferably longer than the pulse duration. Then it basically integrates the coming optical pulses over time. Then a longer optical pulse will result in an electric pulse having a larger amplitude.

In one of the embodiments of the present invention, the electric response of the receiver can be written as follows:

$$I_{electric}(t) = \int_{-\infty}^{t} K(t-\tau) I_{optical}(\tau) d\tau, \qquad (1)$$

where $K(t-\tau)$ is a response function of the receiver characterized by a response time $t_{response}$. In one of practical embodiments, the response function can be written as an exponential, $$K(t-\tau) = K_0 \exp\left[-\frac{t-\tau}{t_{response}}\right]. \qquad (2)$$

Figure 4:
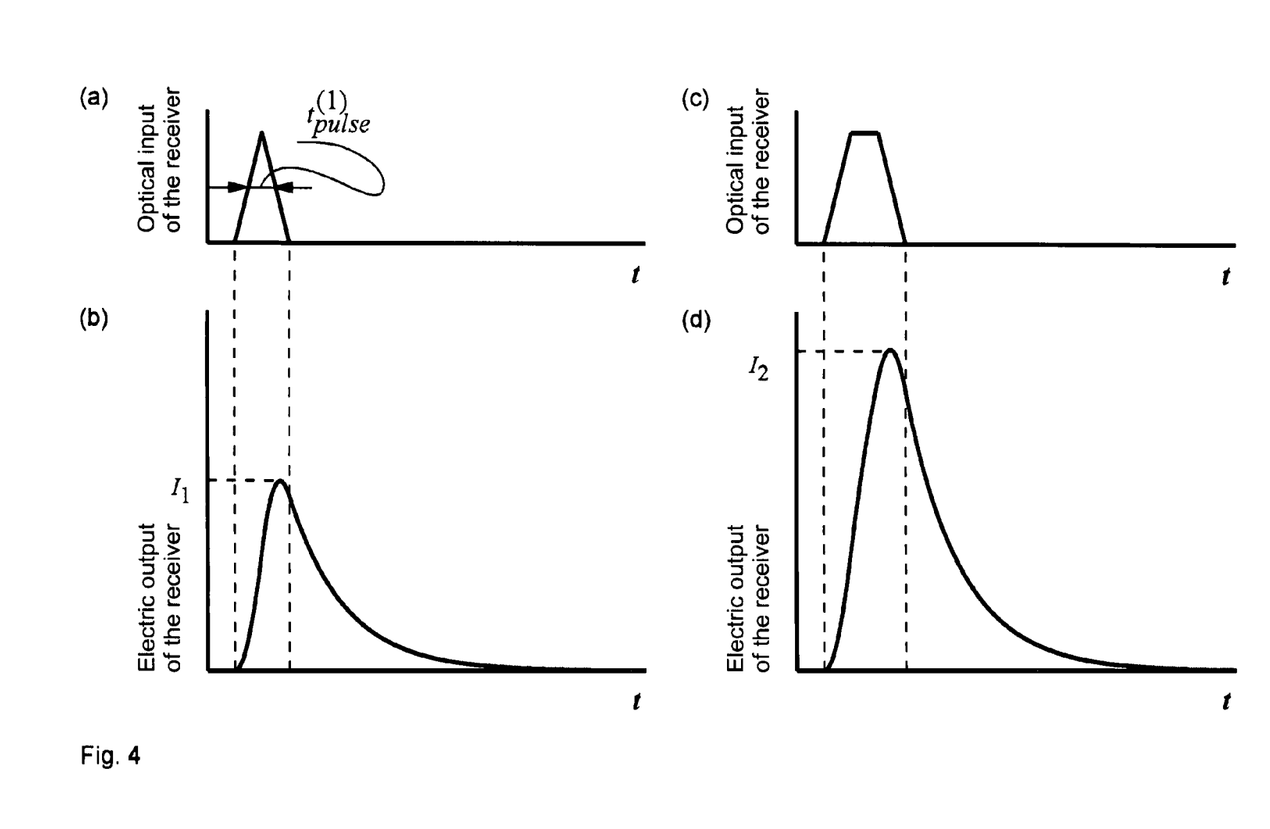
FIG. 4(a) shows schematically a short optical pulse coming to a slow receiver.
FIG. 4(b) shows schematically an electric response of the slow receiver to the short pulse of FIG. 4(a).
FIG. 4(c) shows schematically a long optical pulse coming to the slow receiver.
FIG. 4(d) shows schematically an electric response of the slow receiver to the long optical pulse of FIG. 4(c).

FIG. 4(a) illustrates a short optical pulse coming to the receiver. FIG. 4(b) shows an electric signal generated by the slow receiver as a response to the optical signal of FIG. 4(a).

FIG. 4(c) illustrates a long optical pulse coming to the receiver. FIG. 4(d) shows an electric signal generated by the slow receiver as a response to the optical signal of FIG. 4(c).

Both optical pulses have the same maximum amplitude. After effective integration by the slow receiver the response to a longer optical pulse has larger amplitude than the response to a shorter pulse, $I_2>I_1$ FIGS. 4(a) through 4(d) illustrate results of calculations for the case where the receiver's response time is twice longer than the duration of the shorter pulse $$t_{response} = 2 \times t_{pulse}^{(1)}. \qquad (3)$$

To enable the operation of a system disclosed in the present invention, it is preferred that the response time of the slow receiver exceeds the duration of at least the shorter optical pulse.

Figure 5:
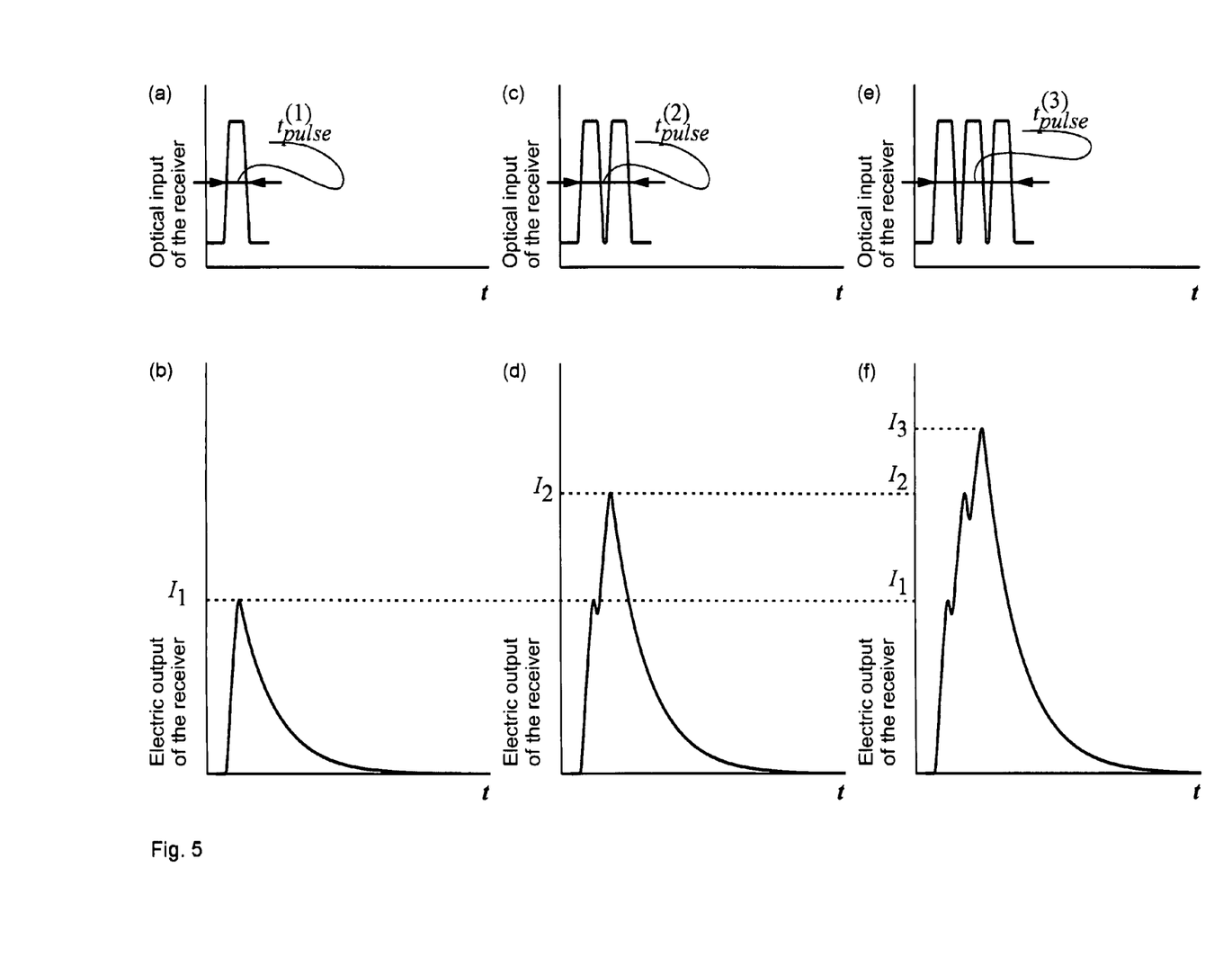
FIG. 5(a) shows schematically a single pulse coming as an optical input signal to a receiver.
FIG. 5(b) shows schematically an electric response of the slow receiver to a single optical pulse of FIG. 5(a).
FIG. 5(c) shows schematically a pulse train consisting of two pulses.
FIG. 5(d) shows schematically an electric response of the slow receiver to a pulse train of FIG. 5(c) consisting of two pulses.
FIG. 5(e) shows schematically a pulse train consisting of three pulses.
FIG. 5(f) shows schematically an electric response of the slow receiver to a pulse train of FIG. 5(e) consisting of three pulses.

A one skilled in the art will appreciate that the effective pulse duration can be controlled in a number of ways and different shapes of the pulses can be used. The effective pulse width can be also defined by a pulse train composed of several short overlapping or non-overlapping pulses. FIG. 5) illustrates schematically the response of the receiver to pulse trains of different duration. FIG. 5(a) shows a single pulse having the duration $t_{pulse}^{(1)}$. FIG. 5(b) depicts the electric output signal of the slow receiver having the maximum amplitude $I_1$. The input optical signal in FIG. 5(c) is a pulse train consisting of two pulses. The effective duration of the train is $t_{pulse}^{(2)}$, and the electric output of the receiver presented in FIG. 5(d) has the maximum amplitude $I_2$. The train consisting of three pulses as an optical input of the receiver as shown in FIG. 5(e) has even longer duration $t_{pulse}^{(3)}$. The electric output signal of the receiver has the maximum amplitude $I_3$. It is shown in FIGS. 5(a) through 5(f) that the $$t_{pulse}^{(1)} < t_{pulse}^{(2)} < t_{pulse}^{(3)}, \qquad (4a)$$

and, correspondingly, $$I_1 < I_2 < I_3. \qquad (4b)$$

Thus, FIG. 5 illustrates the transformation of a sequence of short pulses into an analog output signal. Combining the schematic representation of the system of FIG. 1 and the method of signal detection by the receiver as shown in FIGS. 5(a) through 5(f), one can describe the signal transmission scheme as follows. An electric input signal is generated by an electric circuit in a form of a train of short pulses. The signal drives the fast transmitter resulting in a similar sequence of short optical pulses generated by the transmitter. The optical signal propagates through the optical medium having a zero or a low dispersion. Thus, the optical input signal at the input of the receiver has a similar shape of a short pulse train. The slow receiver transforms the short pulse train into an analogue output electric signal, which has a set number of distinguishable levels.

The number of distinguishable levels should be at least three to realize indeed a multilevel coating.

In the preferred embodiment of the present invention a four-level coding scheme is used.

A one skilled in the art will agree that the described coding scheme allowing up to at least ten distinguishable levels of an analog output signal can be realized.

FIGS. 5(c) and 5(e) show pulse trains composed of non-overlapping pulses. In another embodiment of the present invention, pulse trains are composed of overlapping pulses.

A one skilled in the art will appreciate that once the duration of two pulses of an output optical signal differ at least by ten percent, building a system which will distinguish the output signal amplitude is feasible.

In another embodiment of the present invention, the relationship between the electric signal generated by the receiver and the optical pulse is non-linear. However, a one skilled in the art will agree that a difference in duration of optical pulses will transform into a difference in amplitudes of the electric signals also in this case.

Figure 6:
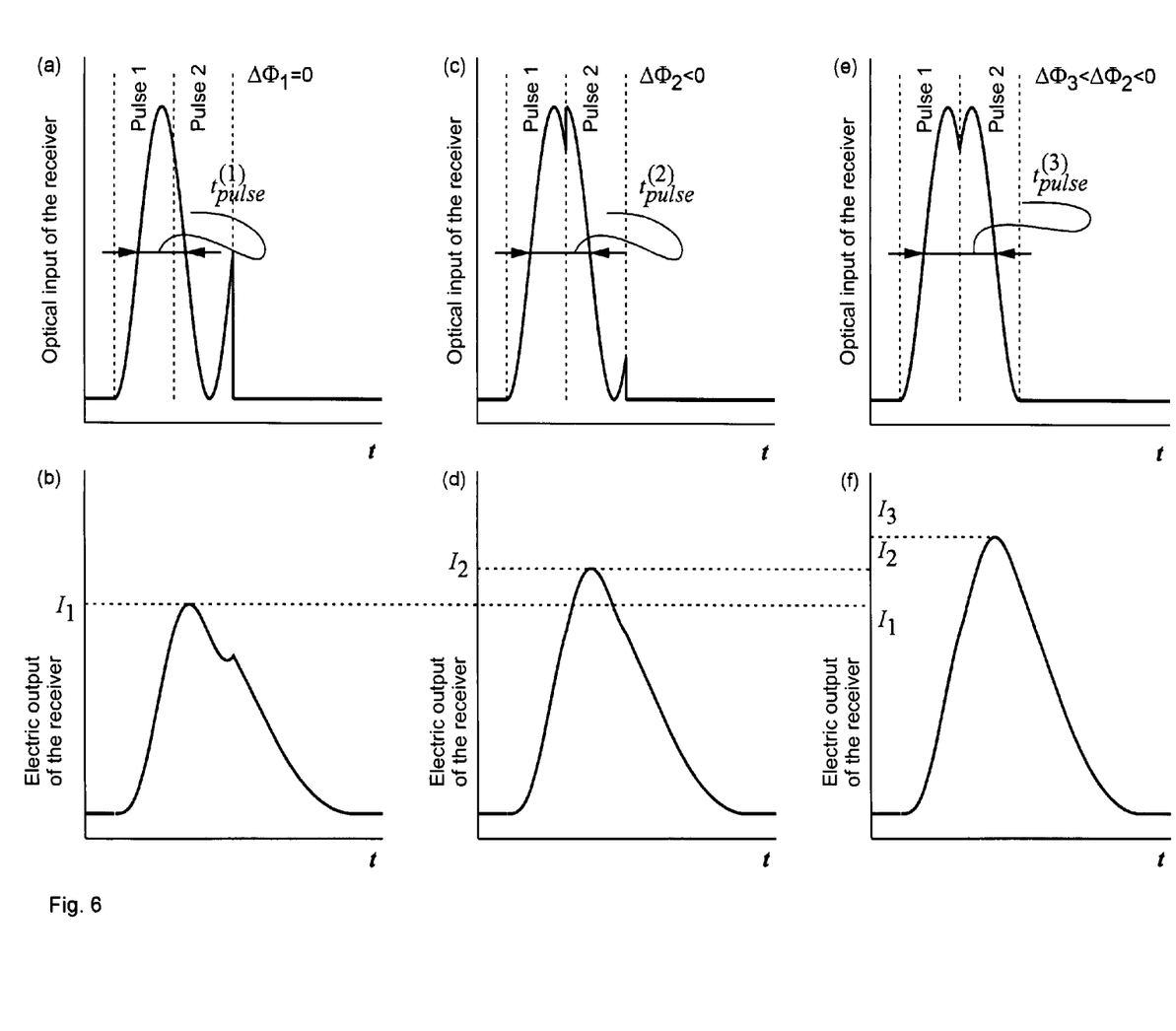
FIG. 6(a) shows schematically a phase-modulated optical input signal, wherein the phase shift between the two pulses is zero, $\Delta\Phi_1=0$.
FIG. 6(b) shows schematically an electric response of the slow receiver to an optical input signal of FIG. 6(a).
FIG. 6(c) shows schematically a phase-modulated optical input signal, wherein the phase shift between the two pulses is $\Delta\Phi_2<0$.
FIG. 6(d) shows schematically an electric response of the slow receiver to an optical input signal of FIG. 6(c).
FIG. 6(e) shows schematically a phase-modulated optical input signal, wherein the phase shift between the two pulses is $\Delta\Phi_3<\Delta\Phi_2<0$.
FIG. 6(f) shows schematically an electric response of the slow receiver to an optical input signal of FIG. 6(e).

In yet another embodiment of the present invention the encoding additionally includes phase shifting of the transmitter pulse or pulses allowing phase shift keying digital modulation approach. FIGS. 6(a) through 6(f) refer to the transformation of phase modulation signal to a multi-level analog signal. FIG. 6(a) refers to the situation, where there is no phase shift between pulse 1 and pulse 2, $\Delta\Phi_1=0$. The response of the receiver shown in FIG. 6(b) has the maximum amplitude $I_1$. FIG. 6(c) shows two input pulses with a non-vanishing phase shift, $\Delta\Phi_2<0$. The input signal combining two consequent input pulses has effective pulse duration longer than that in FIG. 6(c), $t_{pulse}^{(2)}>t_{pulse}^{(1)}$. Correspondingly, the amplitude of the electric output signal in FIG. 6(d) is larger than that in FIG. 6(b), $I_2>I_1$. FIG. 6(e) shows two pulses with a different phase shift, $\Delta\Phi_3<\Delta\Phi_2<0$. Correspondingly, the effective duration of this input signal is even longer, $t_{pulse}^{(3)}>t_{pulse}^{(2)}$, and the maximum value of the output electric signal in FIG. 6(f) is larger, $I_3>I_2$. Thus, FIGS. 6(a) through 6(f) illustrate the following relation between the phase shifts in the output signal, the effective pulse duration in the output signal, and the level of the electric output signal, $$\Delta\Phi_3<\Delta\Phi_2<\Delta\Phi_1=0, \quad (5a)$$

$$t_{pulse}^{(3)}>t_{pulse}^{(2)}>t_{pulse}^{(1)}, \quad (5b)$$

$$I_3>I_2>I_1. \quad (5c)$$

In a further embodiment of the present invention the encoding includes phase and/or frequency modulation keying in analog modulation approaches.

In different embodiments the transmitter can be realized in multiple ways. Possible realizations of the transmitter include but are not limited to light-emitting diode, superluminescent light-emitting diode, and diode laser.

Various types of diode laser can be used. In one embodiment of the present invention, a laser used is an edge-emitting laser, wherein the modulation of the optical signal generated by a transmitter, is realized as direct modulation by modulating a drive current.

In another embodiment of the present invention, the transmitter includes an edge-emitting laser combined with a Mach-Zender electrooptical modulator, wherein the signal output from the transmitter is modulated due to the electrooptical. Or electrorafraction effect. In another embodiment of the present invention, a tilted cavity laser is employed, as disclosed in the U.S. Pat. No. 7,031,360, "Tilted cavity semiconductor laser (TCSL) and method of making same", filed Feb. 12, 2002, issued Apr. 18, 2006, by the inventors of the present invention, which is hereby incorporated herein by reference.

A further embodiment of the present invention is based on a vertical cavity surface emitting laser (VCSEL). In yet another embodiment, the vertical cavity surface emitting laser operates under direct current modulation.

In yet another embodiment, an electrooptically modulated VCSEL (EOM VCSEL) based on two resonating cavities is used as a source of the optically modulated signal, wherein the EOM VCSEL was disclosed in the U.S. Pat. No. 7,369,583 "Electrooptically wavelength-tunable resonant cavity optoelectronic device for high-speed data transfer", filed Jun. 2, 2005, issued May 6, 2008, by the inventors of the present invention, which is hereby incorporated herein by reference.

In a further embodiment, an EOM VCSEL with the modulated stopband edge of a distributed Bragg reflector is used as a source of the optically modulated signal, wherein this type of the EOM VCSEL was disclosed in the U.S. Pat. No. 7,593,436 "Electrooptically Bragg-reflector stopband-tunable optoelectronic device for high-speed data transfer", filed Jun. 16, 2006, issued Sep. 22, 2009, by the inventors of the present invention, which is hereby incorporated herein by reference.

In yet another embodiment of the present invention, the modulation of an optical signal is realized by self-pulsations triggered by the electrorefraction effect in devices containing the saturable absorber sections, as it was disclosed in the U.S. Pat. No. 7,580,595 "Data transmission optoelectric device", filed May 9, 2008, issued Aug. 25, 2009, by Bimberg et al., wherein this patent is hereby incorporated herein by reference.

In an embodiment of the present invention, the receiver is a p-i-n diode.

In another embodiment of the present invention, the receiver is a resonant cavity phtotodetector.

In yet another embodiment of the present invention, the receiver is an avalanche photodiode.

In the preferred embodiments, the optical signal between the transmitter and receiver propagates along an optical fiber.

In another embodiment of the present invention, the optical signal between the transmitter and receiver propagates through air.

In yet another embodiment of the present invention, the optical signal between the transmitter and receiver propagates in the open space.

Other realizations of the optical medium include transparent gas, transparent liquid, or transparent solid different from the optical fiber.

In a further embodiment of the present invention, the carrier signal propagating through the optical medium is an optical wave, the wavelength of which in the vacuum is close to one of the wavelengths 850 nm, 980 nm, 1300 nm, and 1550 nm.

In yet another embodiment of the present invention, the carrier signal is an electromagnetic wave in the radio frequency range.

Although the disclosure describes the system using an optical signal, a one skilled in the art will appreciate that a similar encoding and decoding scheme can be also used in a purely electric data transfer system, wherein the data is transferred along a copper cable or within an integrated circuit, and transformation of a digital input signal into a multi-level analog signal is used.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiments set out above but to include all possible embodiments which can be embodied within a scope encompassed and equivalents thereof with respect to the feature set out in the appended claims.

What is claimed is:

1. A method for encoding and decoding of signals using
   a) a transmitter capable to generate an optical signal when subject to an electric signal, and b) a receiver capable to generate an electric signal when subject to an optical signal;

wherein a multi-level encoding of optical signals is used, wherein said transmitter is capable to generate
- i) "zero" signal, which means no optical signal,
- ii) an optical pulse having a first duration, and
- iii) an optical pulse having a second duration, wherein said second duration is longer than said first duration, and wherein said transmitter is fast and said receiver is slow such that a response time of said receiver exceeds said first duration of said optical pulse generated by said transmitter; and wherein an electric signal generated by said receiver as the response to the optical pulse having said first duration has a first amplitude, and wherein an electric signal generated by said receiver as the response to the optical pulse having said second duration has a second amplitude, and wherein said second amplitude is larger than said first amplitude.

2. The method for encoding and decoding of signals of claim 1, wherein
said second duration of said optical pulse exceeds said first duration by at least ten percent.

3. The method for encoding and decoding of signals of claim 1,
wherein said second amplitude of said electric signal exceeds said first amplitude by at least ten percent.

4. The method for encoding and decoding of signals of claim 1,
wherein the effective pulse width of the transmitter is defined by a pulse train composed of several short overlapping or non-overlapping pulses.

5. The method for encoding and decoding of signals of claim 1,
wherein the encoding additionally includes phase shifting of the transmitter pulse or pulses allowing phase shift keying digital modulation approach and by phase and/or frequency modulation keying in analog modulation approaches.

6. The method for encoding and decoding of signals of claim 1,
wherein said transmitter is selected from the group consisting of
- a) a light-emitting diode;
- b) a superluminescent light-emitting diode; and
- c) a semiconductor diode laser.

7. The method for encoding and decoding of signals of claim 4,
wherein the modulation of the optical signal generated by said transmitter is realized by a method selected from the group consisting of the following methods:
- a) direct current modulation;
- b) indirect modulation by using electroabsorption effect:
- c) indirect modulation by using electrorefraction effect;
- d) self-pulsation triggered by the electrorefraction effect in devices containing the saturable absorber sections,
- e) any combination of a) through d).

8. The method for encoding and decoding of signals of claim 1,
wherein said receiver is selected from the group consisting of
- a) a p-i-n diode; and
- b) a resonant cavity photodetector;
- c) an avalanche photodiode.

* * * * *